United States Patent
Martinazzi et al.

(10) Patent No.: US 9,177,291 B2
(45) Date of Patent: Nov. 3, 2015

(54) CHAINING CONNECTION REQUESTS

(75) Inventors: Peter Henry Martinazzi, San Francisco, CA (US); Simon Jack Bond, San Francisco, CA (US); Naomi Gleit, Palo Alto, CA (US); Jennifer Burge, San Francisco, CA (US); Ziqing Mao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/348,514

(22) Filed: Jan. 11, 2012

(65) Prior Publication Data

US 2013/0179802 A1    Jul. 11, 2013

(51) Int. Cl.
| | |
|---|---|
| *G06F 3/00* | (2006.01) |
| *G06Q 10/10* | (2012.01) |
| *G06F 3/0482* | (2013.01) |
| *G06F 3/048* | (2013.01) |
| *H04L 29/08* | (2006.01) |
| *G06Q 50/00* | (2012.01) |
| *G06Q 30/02* | (2012.01) |

(52) U.S. Cl.
CPC .............. *G06Q 10/101* (2013.01); *G06F 3/048* (2013.01); *G06F 3/0482* (2013.01); *G06Q 30/0201* (2013.01); *G06Q 30/0252* (2013.01); *G06Q 30/0269* (2013.01); *G06Q 50/01* (2013.01); *H04L 67/22* (2013.01); *H04L 67/02* (2013.01)

(58) Field of Classification Search
CPC .......... G06F 17/3089; G06F 17/30905; G06F 17/30899; G06F 3/0481; G06F 9/4443; G06F 17/211; G06F 3/048; G06F 3/0482
USPC .......................................................... 715/738
See application file for complete search history.

(56) References Cited

U.S. PATENT DOCUMENTS

| | | | |
|---|---|---|---|
| 7,761,436 B2 * | 7/2010 | Norton et al. .................. | 707/705 |
| 8,738,634 B1 * | 5/2014 | Roth et al. ..................... | 707/748 |
| 8,788,492 B2 * | 7/2014 | Lu et al. ......................... | 707/732 |
| 2005/0256866 A1 * | 11/2005 | Lu et al. ............................. | 707/5 |
| 2007/0156636 A1 * | 7/2007 | Norton et al. ..................... | 707/1 |
| 2008/0005064 A1 * | 1/2008 | Sarukkai ........................... | 707/3 |
| 2008/0180391 A1 * | 7/2008 | Auciello et al. .............. | 345/156 |
| 2009/0030932 A1 * | 1/2009 | Harik et al. .................... | 707/102 |
| 2009/0164919 A1 * | 6/2009 | Bates et al. .................... | 715/757 |
| 2010/0057859 A1 * | 3/2010 | Shen et al. ..................... | 709/206 |
| 2010/0191844 A1 * | 7/2010 | He et al. ........................ | 709/224 |
| 2010/0325549 A1 * | 12/2010 | Gibson et al. ................. | 715/733 |
| 2011/0213785 A1 * | 9/2011 | Kristiansson et al. ........ | 707/748 |
| 2012/0046051 A1 * | 2/2012 | Wilson et al. .............. | 455/456.3 |
| 2012/0084362 A1 * | 4/2012 | McBrearty .................... | 709/204 |

(Continued)

OTHER PUBLICATIONS

Abram, Facebook For Dummies, 2nd Edition, Wiley Publishing, Inc., Nov. 9, 2010, pp. 60-61.*

*Primary Examiner* — Kieu Vu
*Assistant Examiner* — Andrew Chung
(74) *Attorney, Agent, or Firm* — Baker Botts L.L.P.

(57) ABSTRACT

In one embodiment, a social networking system, in response to receiving an action request from a user, expands the portion of a social networking web site with which the user interacted to initiate the action request, and populates the expanded portion with object suggestions of the same type as the target object of the action request. In particular embodiments, the object suggestions are based at least in part on the characteristics of the target object of the action request. Such embodiments capitalize on the transitory mood of the user and facilitate and promote the chaining of subsequent action requests.

20 Claims, 7 Drawing Sheets

(56) References Cited

U.S. PATENT DOCUMENTS

| | | | |
|---|---|---|---|
| 2012/0089681 A1* | 4/2012 | Chowdhury et al. | 709/206 |
| 2012/0110096 A1* | 5/2012 | Smarr et al. | 709/206 |
| 2012/0316948 A1* | 12/2012 | Shipley et al. | 705/14.23 |
| 2013/0031090 A1* | 1/2013 | Posse et al. | 707/723 |
| 2013/0046824 A1* | 2/2013 | Park et al. | 709/204 |
| 2013/0079149 A1* | 3/2013 | Fletcher et al. | 463/42 |
| 2013/0097180 A1* | 4/2013 | Tseng | 707/748 |
| 2013/0111366 A1* | 5/2013 | Silbey et al. | 715/757 |

* cited by examiner

CHAINING CONNECTION REQUESTS

TECHNICAL FIELD

The present disclosure relates generally to the field of social networking.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

DESCRIPTION OF EXAMPLE EMBODIMENTS

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes. In particular embodiments, any object within the social networking system or node within the social graph may be ranked or scored via a recommendation engine that predicts the expected value of the object or node to the user. Particular embodiments relate to presenting objects or nodes to a particular user that maximize the expected value of the entire system.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. In particular embodiments, the social graph information further includes a plurality of edges that each define or represent a connection between a corresponding pair of nodes in the social graph.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. For example a place, business, or brand may be represented on the social graph by a concept node and its corresponding hub page, and users may make connections to the concept node via an expression of affinity, such as a "like", commenting on the hub page, an expression that the user was physically at the location by "checking in," and the like. Such connections may be represented, in particular embodiments, by edges connecting the user node to the concept node. As another example, events may be represented by a node on a social graph, and users may broadcast their intent to attend the event through an RSVP edge.

In particular embodiments, any piece of content on the social networking system may be considered an object or a node in the social graph. For example, the individual status updates a member writes, or the photos in his or her albums, may each be an object in the social graph. In particular embodiments, objects in the social graph may be "open", meaning third-party developers may utilize an application programming interface to generate custom object types, as well as custom actions that users may perform on the objects, in the social graph.

In particular embodiments, the social networking system may make object recommendations to users browsing the social networking web site. The social networking system may utilize a real-time online learning object recommendation engine to rank particular content objects based on their expected interest level to a particular user, and render the most interesting objects to users. The recommendation engine may possess an online learning component that logs whether a user converts, or acts upon, a particular content object after the initial display, or impression, and updates the recommendation engine substantially in real time with the conversion or lack thereof.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied. As just described, in various example embodiments, one or more described web pages or web applications are associated with a social network environment or social networking service.

Figure 1:
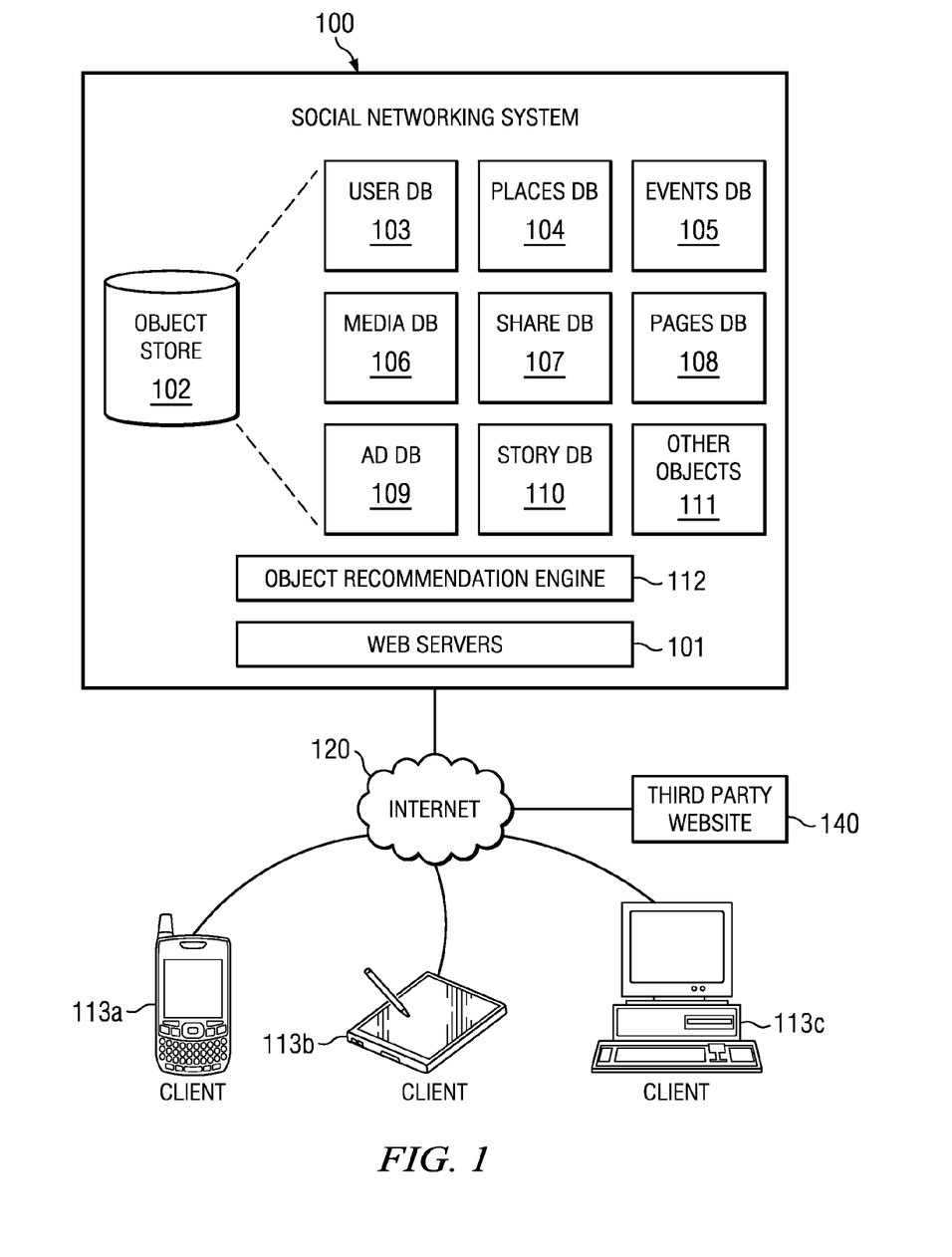
FIG. 1 illustrates an example computer network environment of an example social network environment.

Particular embodiments may operate in, or in conjunction with, a wide area network environment, such as the Internet, including multiple network addressable systems. FIG. 1 illustrates an example network environment, in which various example embodiments may operate. Internet 120 generally represents one or more interconnected networks, over which various systems and hosts described herein may communicate. Internet 120 may include packet-based wide area networks (such as the Internet), private networks, wireless networks, satellite networks, cellular networks, paging networks, and the like. As FIG. 1 illustrates, particular embodiments may operate in conjunction with a network environment comprising social network system 100 and client devices 113a-c, as well as, in some embodiments, one or more third party web application servers 140. Client devices 113a-c, web servers 40, and third-party websites 140 may be operably connected to the network environment and Internet 120 via a network service provider, a wireless carrier, a set of routers or networking switches, or any other suitable means.

Each client device 113 may generally be a computer, computing system, or computing device including functionality for communicating (e.g., remotely) over a computer network. Client device 113 in particular may be a desktop computer 113c, laptop computer, personal digital assistant (PDA), tablet PC 113b, in- or out-of-car navigation system, smart phone 113a or other cellular or mobile device, or mobile gaming device, among other suitable computing devices. Client device 113 may execute one or more client applications, such as a web browser (e.g., Microsoft Windows Internet Explorer, Mozilla Firefox, Apple Safari, Google Chrome, and Opera, etc.), to access and view content over a Internet 120. In particular implementations, the client applications allow a user of client device 113 to enter addresses of specific network resources to be retrieved, such as resources hosted by social networking system 100. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 113 desires to view a particular web page (hereinafter also referred to as a target structured document) hosted by social networking system 100, and made available in conjunction with social networking system 100, the user's web browser, or other client-side structured document rendering engine or suitable client application, formulates and transmits a request to web servers 101 of social networking system 100. The request generally includes a URL or other document identifier as well as metadata or other information. By way of example, the request may include information identifying the user, such as a user ID, as well as information identifying or characterizing the web browser or operating system running on the user's client computing device 113. The request may also include location information identifying a geographic location of the user's client device or a logical network location of the user's client device, as well as timestamp identifying when the request was transmitted.

In an example implementation, when a request for a web page or structured document hosted by social networking system 100 is received by web servers 101 of social networking system 100, one or more page-generating processes executing within the social networking system 100 typically generates a base web page in the form of a Hyper Text Markup Language (HTML), Extensible Markup Language (XML), or other web browser-supported structured document. The generated structured document is then transmitted in a response, which may comprise one or more portions or partial responses, to the requesting client 113 via a Hypertext Transfer Protocol (HTTP) or other suitable connection for rendering by the web browser at the client device 113. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social networking system 100 or at one or more external locations, to the client device 113 requesting the web page. Typically, upon receipt of the response, the web browser or other client document rendering application running at the client device 113 then constructs a document object model (DOM) representation of the received structured document and requests the resource(s) (which may be at one or more other external locations) embedded in the document.

In an example implementation, when a registered user of social networking system 100 first requests a web page from social networking system 100 in a given user session, the response transmitted to the user's client device 113 from web servers 101 of social networking system 100 may include a structured document generated by the page-generating process for rendering a login page at the client device. The user may then enter his or her user login credentials (e.g., user ID and password), which are then transmitted from the user's client device 113 to social networking system 100. Upon successful authentication of the user, social networking system 100 may then transmit a response to the user's web browser at the user's client device 113 that includes a structured document generated by the page-generating process for rendering a user homepage or user profile page at the user's client device.

In one example embodiment, social networking system 100 comprises computing systems that allow users at client devices 113 to communicate or otherwise interact with each other and access content, such as user profiles, as described herein. Social networking system 100 is a network addressable system that, in various example embodiments, comprises one or more physical servers as well as one or more data stores. The one or more physical servers are operably connected to Internet 120 via, by way of example, a set of routers or networking switches. In an example embodiment, the functionality hosted by the one or more physical servers may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

The physical servers may host functionality directed to the operations of social networking system 100. By way of example, social networking system 100 may host a website that allows one or more users, at one or more client devices 113, to view and post information, as well as communicate with one another via the website. Hereinafter, the physical servers may be referred to as web server 101, although, as just described, the servers may include numerous servers hosting, for example, social networking system 100, as well as other content distribution servers, data stores, or databases.

The data store may comprise object store 102, which may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, object store 102 corresponds to one or more of a variety of separate or integrated databases, such as relational databases and object-oriented databases, that maintain information as an integrated collection of logically related records or files stored on one or more physical systems.

In particular embodiments, object store 102 may include a number of databases. For example object store 102 may include user database 103 containing information pertaining to every single user of social networking system 100. In particular embodiments, object store 102 may include places database 104, containing information pertaining to physical locations or businesses represented by concept nodes in social networking system 100. In particular embodiments, users or other node administrators may create event pages for particular real-world events users may attend. Information regarding these events may be stored in events database 105. In particular embodiments, media objects, such as photos, albums, videos, and the like may be stored in media database 106. In particular embodiments, users may share links to other content hosted on third party websites 140 or external application servers. In particular embodiments, each link may be represented by a node on the social graph. In particular embodiments, shared links may be stored as objects within share db 107, or alternatively story database 110. In particular embodiments, each concept node may be represented by a hub page, and both the nodes and pages may be stored in pages database 106. In particular embodiments, individual advertisements may be treated as objects within social networking system 100, and advertisements may be stored in ad db 109. In particular embodiments, individual newsfeed stories, status updates, check-ins, and the like may be stored in story database 110. Finally custom objects defined by third-parties may be stored in other object store 111. Individual databases 103-111 may be located on one or more physical servers. In particular embodiments, individual databases 103-111 may be located in a single server. This disclosure contemplates any suitable means of storing objects of social networking system 100 in any physical configuration.

Structurally, object store 102 may generally include one or more of a large class of data storage and management systems. In particular embodiments, object store 102 may be implemented by any suitable physical system(s) including components, such as one or more database servers, mass storage media, media library systems, storage area networks, data storage clouds, and the like. In one example embodiment, object store 102 includes one or more servers, databases (e.g., MySQL), and/or data warehouses.

Object store 102 may include data associated with different social networking system 100 users, client devices 113, web servers 101 as well as, in particular embodiments, data associated with various concepts. As described above, particular embodiments relate to a social networking system 100 that includes a platform enabling an integrated social network environment. In the following example embodiments, the social network environment may be described or implemented in terms of a social graph including social graph information. In particular embodiments, object store 102 includes a the social graph database in which the social graph information for use in implementing the social network environment described herein is stored. In particular embodiments, the social graph information stored by social networking system 100 in object store 102, and particularly in the social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Social networking system 100 may include object recommendation engine 112. Object recommendation engine may determine, for any given user and any given object in object store 102, the expected probability that the particular user may find the object engaging. In particular embodiments, object recommendation engine 112 utilizes a probabilistic model to calculate an expected value for the user. For further detail on object recommendation engine, see commonly-owned U.S. patent application Ser. No. 13/313,984, filed on 7 Dec., 2011 and entitled, "Real-Time Online-Learning Object Recommendation Engine", the contents of which are fully incorporated by reference herein.

As disclosed in U.S. patent application Ser. No. 13/313,984, in particular embodiments, object recommendation engine 112 may factor the user's historical engagement with particular object types based on a probabilistic model. However, while a logistic regression may accurately model a particular user's predilection for engaging certain social networking objects over the duration of the model, it may fail to capture short-term trends, or "bursty," behavior. For example, a user may be in the mood to perform a particular action or engage with a particular object type for a short period of time, but not very frequently over the life of the model. As an example, a user may be in the "friending" mood, where he or she is actively searching for other users to add as first-degree connections.

As another example, a user may be in a mood to subscribe to, or follow, the public posts of celebrities, writers, and other public figures. Although adding friends and following public figures comprises an insignificant portion of the user's total actions on social networking system 100, it is advantageous and beneficial to the user for social networking system 100, via object recommendation engine 112 or another application, to infer the type of "mood" the user is in based on his or her actions, and provide additional suggestions to the user that further facilitate the "mood." Additionally, because the user's focus is directed to a particular portion of a website when the user performs a particular action, it is advantageous for social networking system 100 to display suggestions to the same area of focus to promote sequential, or "chaining" of, actions. Thus, in particular embodiments, object recommendation engine 112 may expand portions of a social networking web page in response to a particular action associated with the portion, and present additional object recommendations to the user based on the nature and type of the previous action to promote successive chaining of actions.

Figure 2A:
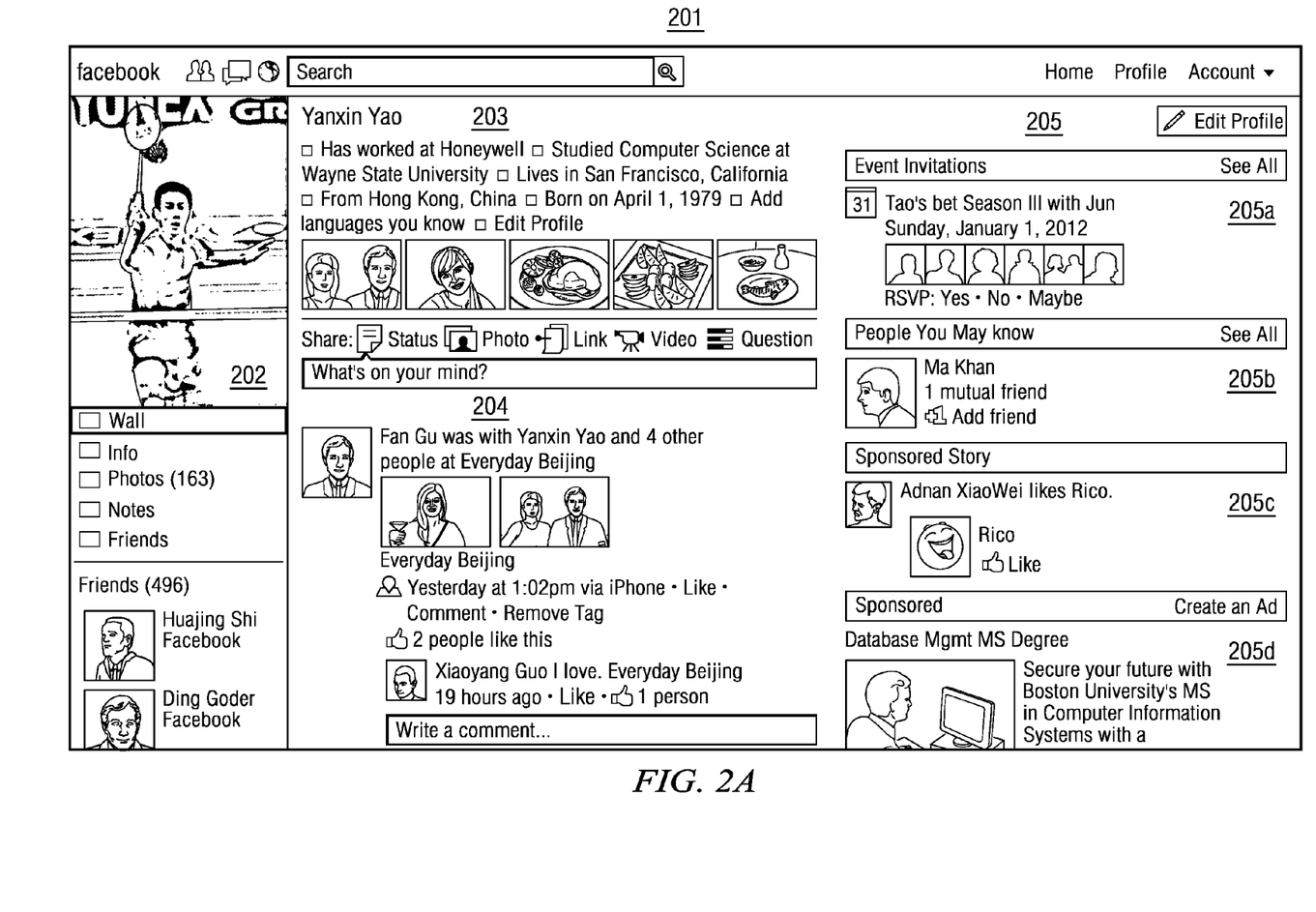
FIG. 2A illustrates an example profile page including recommended objects.

FIG. 2A illustrates an example profile page including objects recommended to a particular user by social networking system 100. In FIG. 2, profile page 201 includes multiple elements that are generated by social networking system 100 and delivered to a user's client device 113a-c via web servers 101. Profile page 201 may include, for example, the user's profile picture 202, basic information 203, and a newsfeed 204 of the recent or most interesting activities of the user's connections. In particular embodiments, profile page 201 includes a right-hand column 205 that may include dynamically-generated and user-specific objects for display to the user. For example, right-hand column 205 may include event invitations 205a, a user suggestion object ("people you may know") 205b, sponsored stories 205c, and advertisements 205d. In particular embodiments, each of these elements may be a specific object within social networking system 100 that may be scored and ranked specifically for the user such that the most interesting content is delivered on the right-hand column. For example, when a user is viewing his or her profile page, the user may be most interested in connecting with new users, rather than, for example, browsing his or her existing connections' photo albums. In particular embodiments, social networking system takes into account the user's current page context in determining the type of objects to recommend to the user. Even having filtered the potential objects, for didactic purposes in FIG. 2, to new users, social networking system 100 must determine which users the viewing user will find the most interesting, or, in other words, which users the viewing user is most likely to click on. In particular embodiments, social networking system utilizes a heuristic model based on the viewing user's previous viewing history to calculate an expected value for each user object candidate to be displayed to the viewing user. In particular embodiments, objects 205a-d are generated and pushed to the user via recommendation engine 112 prior to any user action.

Figure 2B:
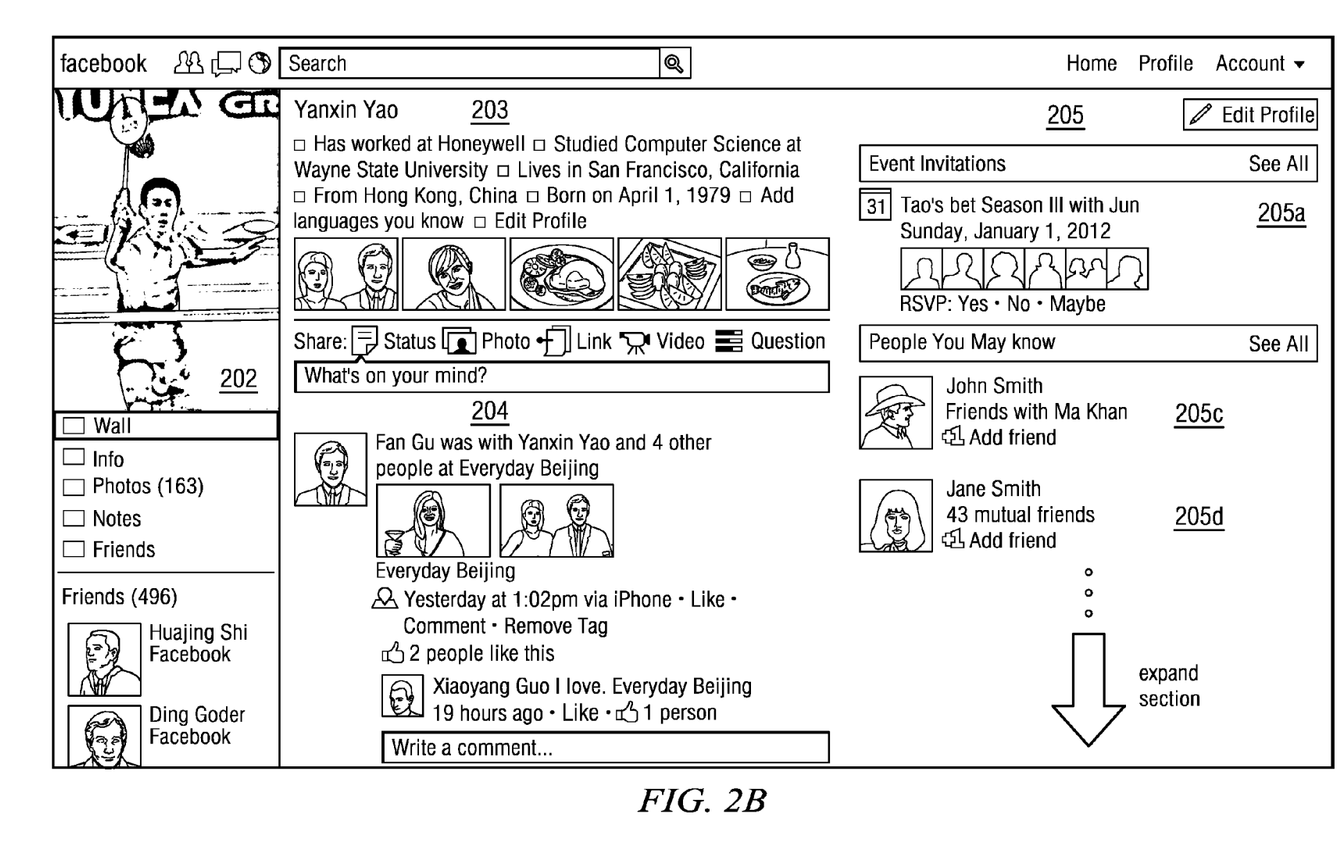
FIG. 2B illustrates an expanded version of the profile page of FIG. 2A after receiving an action request from the user.

FIG. 2B illustrates the example profile page of FIG. 2A after the user requests a specific action, in this example, clicking the "add friend" link in user suggestion object 205b in the "people you may know" portion of the profile page. When the user clicks the "add friend" button in object 205b, the user's client device transmits an action request to social networking system 100 via web servers 101. In this example, the action request instructs social networking system 100 to transmit a friend request from the user to the user specified in 205b (in this example, "Ma Kahn"). Social networking system may represent this action by drawing a "friend request" edge between the nodes representing the user and the node representing "Ma Kahn" in the social graph.

In response to receiving the action request to add a friend from the user, social networking system 100 may infer that the user is in a "friending mood," that the user is actively searching for other users to add as friends or first-degree connections. Thus, to accommodate the user's inferred "friending" mood, social networking system 100 may present other users to the user that he or she is likely to add as a connection. In particular embodiments, this is achieved by expanding the portion associated with the action request, or the particular focus area of the web page that the user clicked on or otherwise interacted with to transmit the request. In the example of FIG. 2B, the user clicked on the "add friend" link from recommended object 205b in the "people you may know" section of the right-hand column, and social networking system 100 transmits an expanded "people you may know" section to the user containing one or more additional user object suggestions 205c and 205d.

In particular embodiments, object recommendation engine 112 suggests additional users 205c and 205d based on a number of social factors. In particular embodiments, object recommendation engine 112 calculates a social coefficient between the user and each user that may be suggested to the user, and presents only those users with the highest social coefficient. The social coefficient may be based on any number of possible demographic factors gleaned from profiles of the user and potential suggestion, such as number of mutual friends, age, geographic area, hometown, occupation, school, employer, interests, gender, political views, the number of photos or videos the users are tagged in together, the number of events the two users have RSVP'd to together, the number of common check-in locations, etc. This disclosure contemplates any suitable method of calculating a social coefficient between a user and a user to be suggested to the user.

In particular embodiments, object recommendation system factors properties of the object which was interacted with by the user to initiate the expansion or "chaining" operation. For example, because the user initiated the expansion of the "people you may know" section by adding "Ma Kahn" as a friend, object recommendation engine 112 may prioritize the display of friends of "Ma Kahn" to the user. In particular embodiments, users who are friends of "Ma Kahn", in this example, user object 205c ("John Smith") may have their social coefficient more heavily weighted, and therefore displayed first to the user. In particular embodiments, only after all the friends of "Ma Kahn" have been displayed to the user are other user object suggestions, such as user object 205d ("Jane Smith") are displayed to the user.

In particular embodiments, the expanded portion of the web page is unobtrusive and does not otherwise affect the user experience of the requested web page. For example, the expanded "people you may know" section does not obscure any of the main content of the requested web page, and is limited to the right-hand column. In particular embodiments, the expanded portion or section may be a pop-up window. In particular embodiments, the expanded section may navigate the user to a dedicated page for facilitating chaining of the received action request. This disclosure contemplates any suitable method of presenting additional object suggestions to a user in response to a received connection or action request.

Figure 3A:
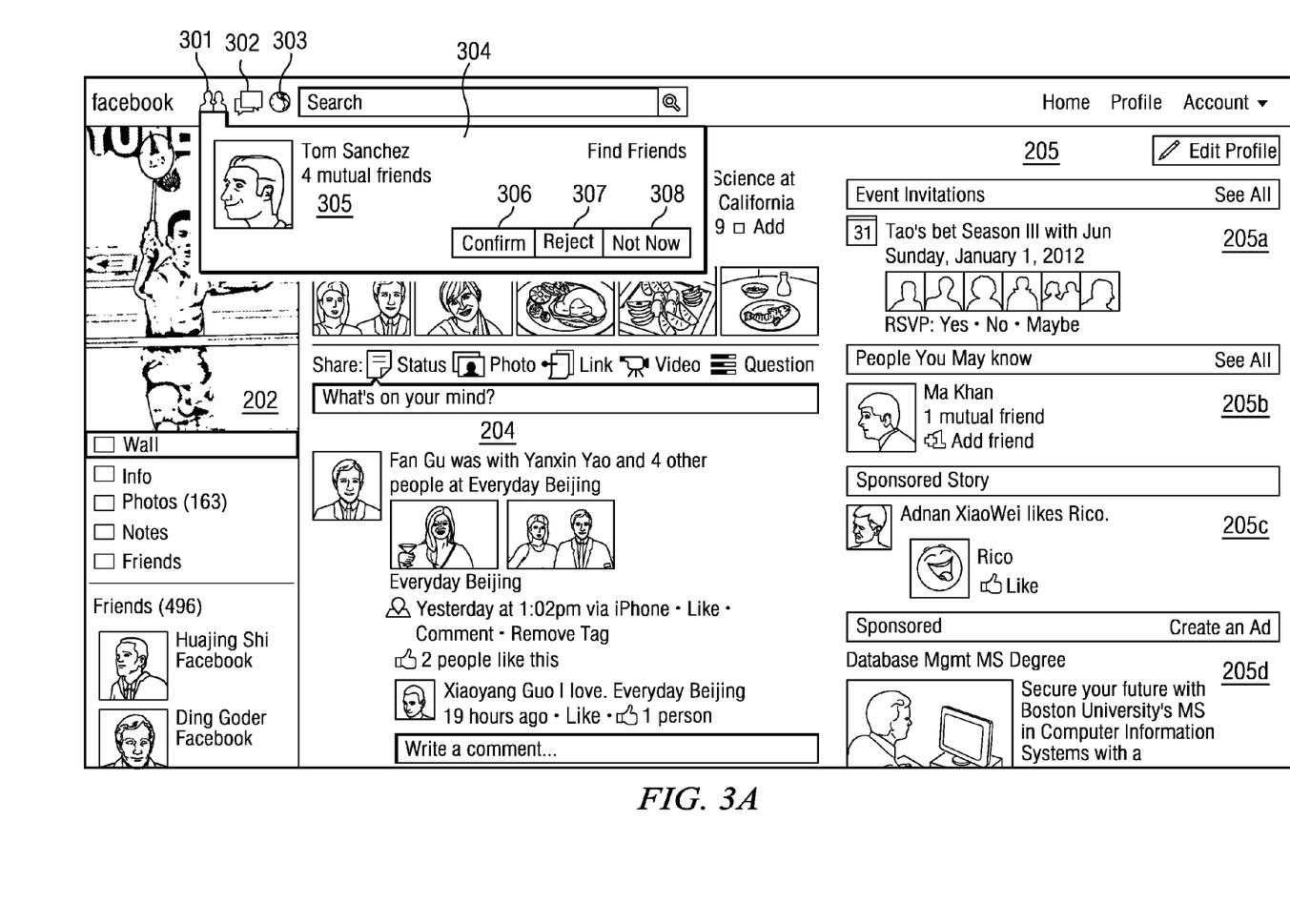
FIG. 3A illustrates an example profile page presented to a user for confirming a connection request.

FIG. 3A illustrates an example profile page where the user has received a friend request from another user. In particular embodiments, friend requests may be displayed in an easily-identifiable menu area, such as the upper-left corner of the example profile page of FIG. 3A. In particular embodiments, the menu area may include icons that visibly change in order to inform the user of particular notifications. For example, friend icon 301 may be highlighted to indicate to the user that he or she has received a friend request. In particular embodiments, icon 301 may also display a number to indicate the number of friend requests the user has received. As another example, message icon 302 may be highlighted or change color/size in order to inform the user that he or she has received a message. Similarly, message icon 302 may also indicate the number of messages the user has received. As another example, event icon 303 may be highlighted to notify the user when another user has interacted with him or her on the social network.

In the example of FIG. 3A, the user clicks friend icon 301 to view his or her pending friend requests, and social networking system 100 displays a drop-down menu 304 containing one or more friend requests pending the user's approval via web server 101. Drop-down menu 304 may include a friend summary 305 for the user who has requested to become friends with the user. Friend summary 305 contains, in particular embodiments, the requesting user's name, profile, picture, and number of mutual friends. This disclosure contemplates the display of any social information in friend summary 305.

Drop-down menu 304 may also include, for each friend request, a selectable user interface element 306 to confirm the friend request, a selectable user interface element 307 to reject the request, and a selectable user interface element 308 to temporarily postpone any action on the friend request.

Figure 3B:
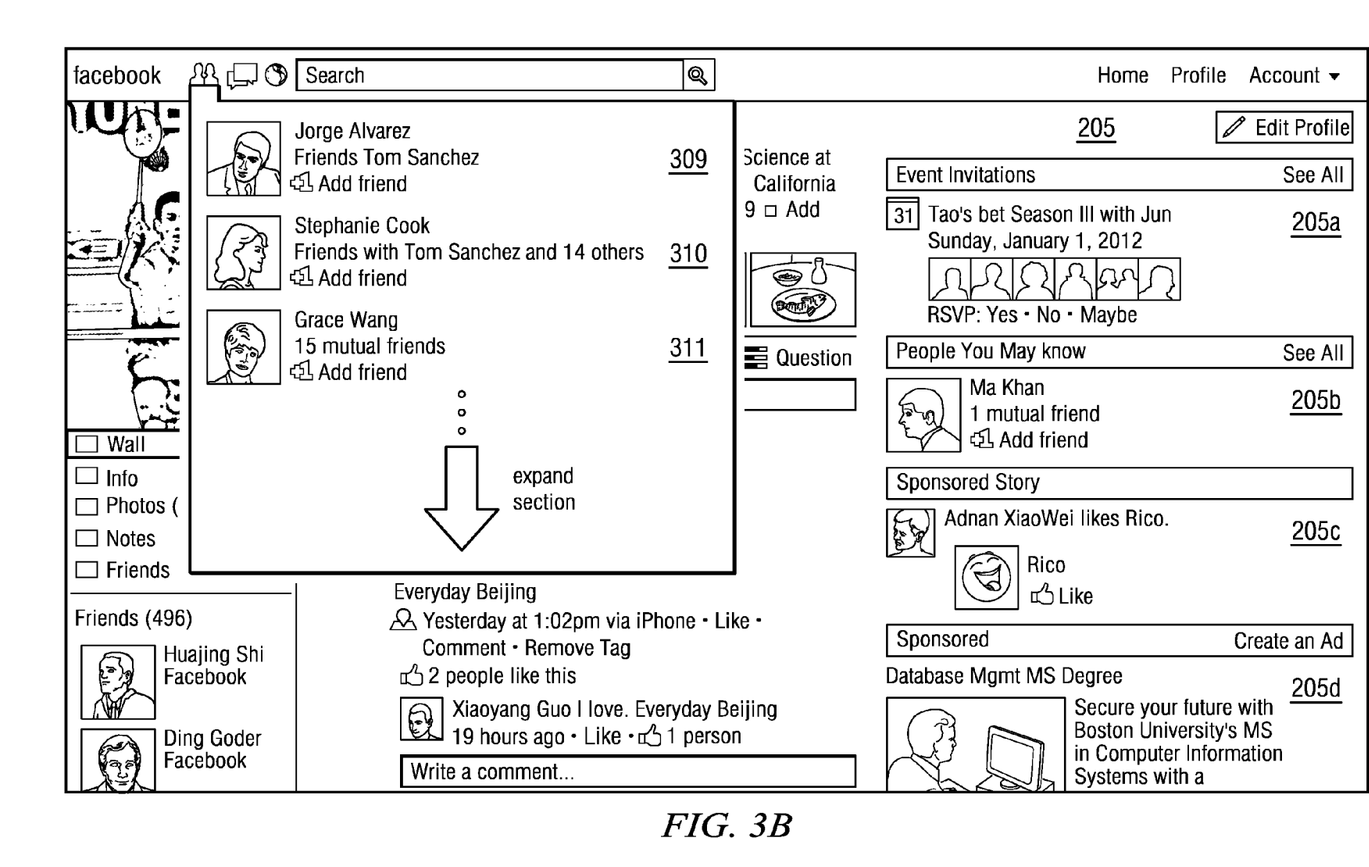
FIG. 3B illustrates an expanded version of the profile page of FIG. 3A after receiving an action request from the user.

FIG. 3B illustrates an example web page containing an expanded drop down menu 304 as a result of the user confirming a friend request, in this example, the request from "Tom Sanchez." As previously described, in particular embodiments, social networking system 100 may expand drop down menu 304 to facilitate the user's "friending" mood, and object recommendation system 112 may recommend one or more user objects 309 ("Jorge Alvarez"), 310 ("Stephanie Cook"), and 311 ("Grace Wang") to the user. As previously described, object recommendation engine 112 may bias or weight the social coefficient of the friends of the recently confirmed friend (in this example, "Tom Sanchez"), more heavily so that they are displayed first to the user. In particular embodiments, object recommendation engine 112 may display friend suggestions for users who are in the same geographic area as the user. In particular embodiments, object recommendation engine 112 may use GPS data from the user's mobile devices, check-ins to physical locations, or any other suitable method of determining user location.

In particular embodiments, expanded drop-down menu 304 may be sized appropriately in order not to obscure other elements of the social networking web page. In particular embodiments, expanded drop-down menu 304 may be scrollable. In particular embodiments, expanded drop-down menu 304 may be closed simply by the user clicking on outside of expanded drop-down menu 304. This disclosure contemplates any suitable means of displaying additional user object recommendations or suggestions to the user in response to confirming a friend request.

Figure 4:
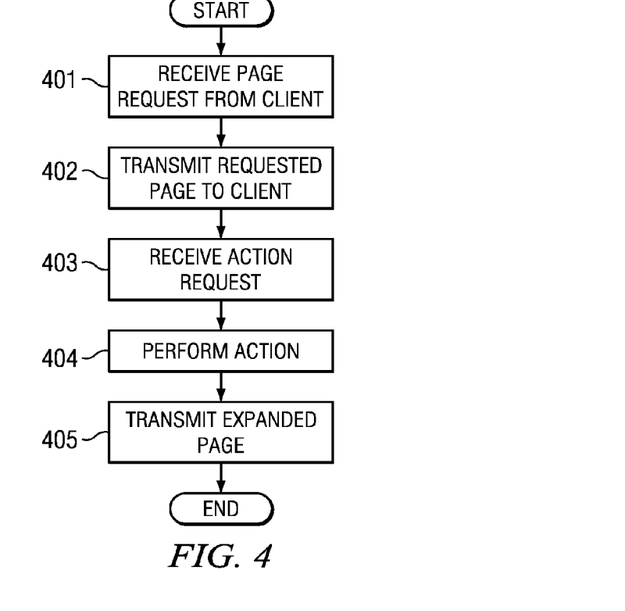
FIG. 4 illustrates an example method for generating recommended objects in response to an action request.

FIG. 4 illustrates an example method of generating object recommendations in response to an action request. At Step 401, a user of the social networking system requests a page of content. As previously disclosed, the page may be his or her own profile page, another user's profile page, a photo album, a photo, or the like.

At Step 402 social networking system 100 transmits the requested page via web server 101 to the user. As previously disclosed, any particular requested page may include multiple user-selectable elements operable to transmit action or connection requests to social networking system 100. In particular embodiments, icons 301-303 are present on every requested page. In particular embodiments, right hand side, including object recommendation suggestion 205b, is included in every requested page. This disclosure contemplates any suitable arrangement of object elements in a requested social networking web page.

Regardless of the particular or specific arrangement of elements in the requested page, at Step 403, social networking system 100 receives an action request from the user. For example, as a result of confirming a friend request, requesting to add a friend, requesting to follow or subscribe to a public figure, to "like" or "fan" a page (such as a sports team, product, brand, TV show, or the like), or RSVP to an event. This disclosure contemplates expanding a section and recommending objects in response to receiving any suitable action request.

At Step 404, social networking system performs the requested action. In particular embodiments, performing the action comprises drawing appropriate edges between nodes of the social graph. For example, when a user requests to subscribe to a public figure, social networking system 100 draws a "follow" or "subscription" edge between the user node and the node representing the public figure. As another example, when a user chooses to "like" or "fan" a particular page, for example a local business or band, social networking system may, in particular embodiments, draw an edge between the user node and the concept node representing the business or band in the social graph. This disclosure contemplates any suitable means of performing the requested action in Step 403.

At Step 405, social networking system generates an expanded portion of the requested page, and transmits it to the user's client device via web server 101. In particular embodiments, social networking system 100 transmits a markup file representing the entire page including the expanded portion. In particular embodiments, social networking system transmits only the expanded portion to the client device. In particular embodiments, the portion of the requested page that is expanded corresponds to the area of the requested page with which the user interacted to initiate the action request. For example, if the user interacted with the "people you may know" element on the right hand side of the requested page, the "people you may know" element is expanded. As another example, if the user interacted with drop-down menu 304, drop-down menu 304 is expanded to maintain the user's focus and attention. In particular embodiments, the expanded portion is populated with object suggestions by object recommendation engine 112 that re of the same type as the object interacted with to begin the chaining operation. In particular embodiments, object recommendation engine 112 generates object recommendations that are related to the object with which the user interacted to initiate the chaining operation.

Figure 5:
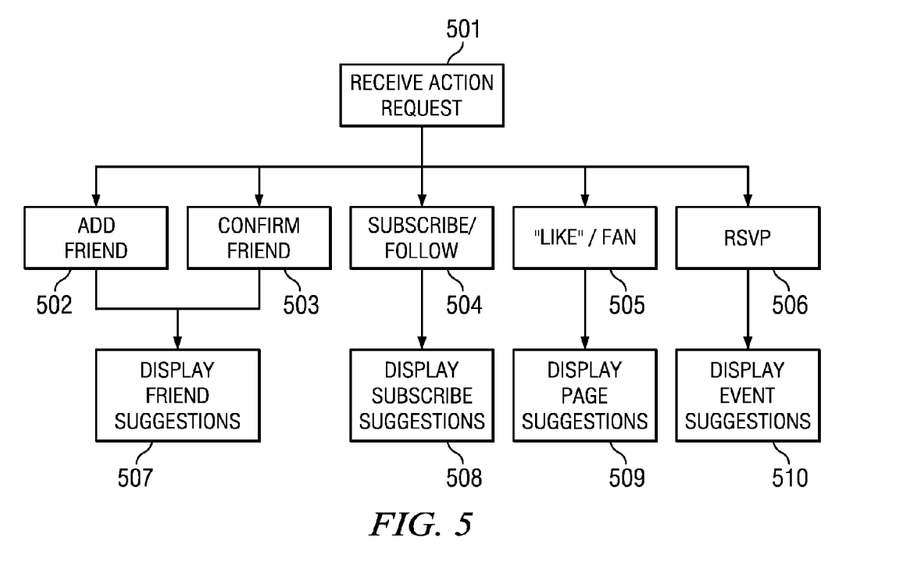
FIG. 5 illustrates an example method for generating recommended objects based on an action request type.

FIG. 5 illustrates an example method facilitating chained action requests based on the type of received action. At Step 501, social networking system 100 receives an action request via web server 110 from a particular user. In one embodiment, where the action is a request to add a friend 502, social networking system generates an expanded portion and displays more friend suggestions (user objects) to the requesting user at Step 507. As previously disclosed, the friend suggestions may be biased towards the friends of the requested user. As previously disclosed, the friend suggestions may be based on a social coefficient. In particular embodiments, when a user submits an action request to confirm a friend request 503, the same expanded portion of friend requests 507 is displayed to the user.

Similarly, if the user requests to subscribe to the public posts of another user, such as a celebrity or blogger, by submitting a subscribe/follow action request at Step 504, social networking system 100 may display an expanded portion including a plurality of other users having public posts that the user may wish to subscribe to or follow in Step 508. In particular embodiments, social networking system suggests people to follow based on the interests of the users. In particular embodiments, social networking system 100 biases the suggestions toward users who are similar to the user subscribed to in Step 504.

As another example, when a user submits an action request to "like" or become a "fan" of a page at Step 505, social networking system 100 may display a set of page suggestions to the user in an expanded portion in Step 509. In particular embodiments, the suggestions may be biased toward pages that are similar to the page liked or fanned in Step 505. In particular embodiments, the page suggestions may be based on what pages other users, who have also liked the page that was liked in Step 505, also like. This disclosure contemplates any suitable means of generating page suggestions.

Finally, in particular embodiments, where the user transmits an event RSVP in Step 506, social networking system 100 may generate event suggestions for display to the user in Step 510. In particular embodiments, the event suggestions are based on the event RSVP'd to in Step 506. For example, social networking system 100 may cross-reference the user's friend list with the guest list of the event in order to determine a set of the user's friends who are attending the event, search for other events that the same set of users are attending, and suggest those events to the user. In particular embodiments, social networking system may suggest events that are similar to the event RSVP'd to in Step 506. This disclosure contemplates generating suggestions for any type of received action request and displaying the suggestions in an expanded area of focus associated with the action request (or with which the user interacted to generate the action request). This disclosure contemplates any suitable method of generating the suggestions based on the object associated with the initial action request to further facilitate the chaining of subsequent requests.

Figure 6:
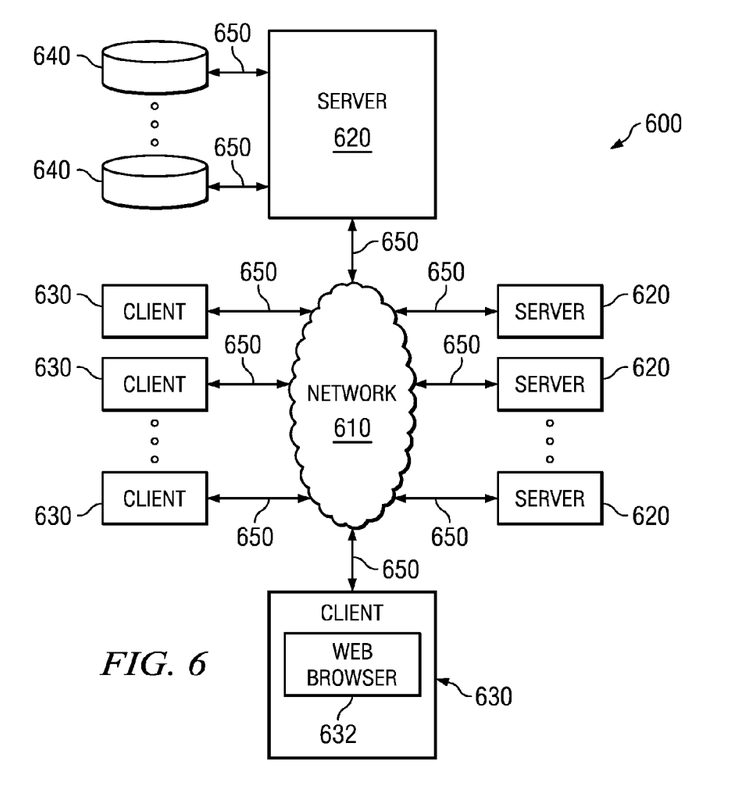
FIG. 6 illustrates an example network environment.

While the foregoing embodiments may be implemented in a variety of network configurations, the following illustrates an example network environment for didactic, and not limiting, purposes. FIG. 6 illustrates an example network environment 600. Network environment 600 includes a network 610 coupling one or more servers 620 and one or more clients 630 to each other. Network environment 600 also includes one or more data storage 640 linked to one or more servers 620. Particular embodiments may be implemented in network environment 600. For example, social networking system frontend 120 may be written in software programs hosted by one or more servers 620. For example, event database 102 may be stored in one or more storage 640. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functions implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
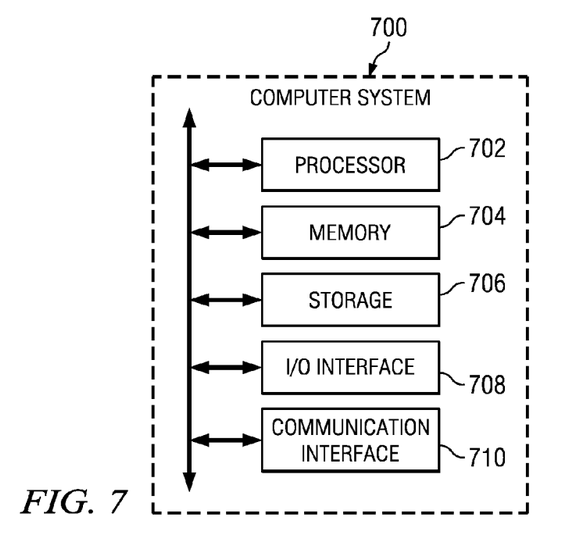
FIG. 7 illustrates an example computer system architecture.

FIG. 7 illustrates an example computing system architecture, which may be used to implement a server. In one embodiment, hardware system 700 comprises a processor 702, a cache memory 704, and one or more executable modules and drivers, stored on a tangible computer readable medium, directed to the functions described herein. Additionally, hardware system 700 includes a high performance input/output (I/O) bus 706 and a standard I/O bus 708. A host bridge 708 couples processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 717, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x76-compatible processors manufactured by Intel Corporation of Santa Clara, Calif., and the x76-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 702.3) network, a backplane, etc. Mass storage 717 provides permanent storage for the data and programming instructions to perform the above-described functions implemented in the servers 22a, 22b, whereas system memory 714 (e.g., DRAM) provides temporary storage for the data and programming instructions when executed by processor 702. I/O ports 620 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

In one implementation, the operations of the embodiments described herein are implemented as a series of executable modules run by hardware system 700, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 702. Initially, the series of instructions may be stored on a storage device, such as mass storage 717. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 716. The instructions are copied from the storage device, such as mass storage 717, into memory 714 and then accessed and executed by processor 702.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. By way of example, while embodiments have been described as operating in connection with a social networking website, the disclosure can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising, by one or more computing systems:
sending, to a client computing device associated with a first user of a social-networking system, one or more social-networking content objects for rendering in a graphical user interface of the client computing device, wherein each of the content objects comprises a user-selectable action, and the sending the content objects is performed based at least in part on data associated with the first user in the social-networking system;
receiving, from the client computing device, a selection of a user-selectable action for one of the content objects, wherein the user-selectable action is associated with a second user of the social-networking system;
performing the user-selectable action;
in response to the received selection, determining one or more suggested users based on the second user, wherein the suggested users are selected from one or more additional users of the social-networking system, a respective social coefficient being computed as between the second user and each of the additional users,
the social coefficients being determined based on one or more demographic factors, the social coefficients for the suggested users being higher than the social coefficients for the other additional users who were not selected, and
the social coefficients of the additional users who are friends of the second user being more heavily weighted than the social coefficients of the additional users who are not friends of the second user; and
sending, to the client computing device, one or more additional content objects associated with the suggested users for rendering in the portion of the graphical user interface, wherein the portion of the graphical user interface is expanded to display the additional content objects when rendered, and
the additional content objects comprise one or more additional user-selectable actions associated with the suggested users.

2. The method of claim 1, wherein the selected action comprises sending a friend request to the second user of the social-networking system, and the one or more additional user-selectable actions comprise sending a friend request to the one or more suggested users of the social-networking system.

3. The method of claim 2, wherein the one or more suggested users comprise mutual friends of the first user and the second user in the social-networking system.

4. The method of claim 2, wherein one or more of the additional objects associated with one or more of the suggested users are displayed in the graphical user interface, when rendered, in order of decreasing social coefficient with respect to the first user.

5. The method of claim 1, wherein the selected action comprises confirming a friend request from the second user of the social-networking system, and wherein the one or more additional user-selectable actions comprise sending a friend request to the one or more suggested users of the social-networking system.

6. The method of claim 5, wherein the one or more suggested users comprise mutual friends of the first user and the second user in the social-networking system.

7. The method of claim 1, wherein the one or more social-networking content objects correspond to one or more users of the social-networking system.

8. The method of claim 1, wherein the selected action comprises subscribing to the second user of the social-networking system, and wherein the one or more additional user-selectable actions comprise subscribing to the one or more suggested users of the social-networking system.

9. The method of claim 1, wherein the selected action comprises liking a page of the social-networking system, and wherein the one or more additional user-selectable actions comprise liking one or more other pages of the social-networking system.

10. The method of claim 1, wherein the selected action comprises RSVPing to an event of the social-networking system, and wherein the one or more additional user-selectable actions comprise RSVPing to one or more other events of the social-networking system.

11. The method of claim 1, wherein the portion comprises an area for recommending the one or more suggested users.

12. The method of claim 1, wherein the portion is an expandable icon for managing friend requests in the social-networking system.

13. One or more non-transitory, computer-readable media comprising instructions operable, when executed by one or more computing systems, to:
send, to a client computing device associated with a first user of a social-networking system, one or more social-networking content objects for rendering in a graphical user interface of the client computing device, wherein each of the content objects comprises a user-selectable action, and the sending the content objects is performed based at least in part on data associated with the first user in the social-networking system;
receive, from the client computing device, a user-selectable action for one of the content objects, wherein the user-selectable action is associated with a second user of the social-networking system;
perform the user-selectable action;
in response to the received selection, determine one or more suggested users based on the second user, wherein the suggested users are selected from one or more additional users of the social-networking system, a respective social coefficient being computed as between the second user and each of the additional users,
the social coefficients being determined based on one or more demographic factors, the social coefficients for the suggested users being higher than the social coefficients for the other additional users who were not selected, and
the social coefficients of the additional users who are friends of the second user being more heavily weighted than the social coefficients of the additional users who are not friends of the second user; and
send, to the client computing device, one or more additional content objects associated with the suggested users for rendering in the portion of the graphical user interface, wherein the portion of the graphical user interface is expanded to display the additional content objects when rendered, and
the additional content objects comprise one or more additional user-selectable actions associated with the suggested users.

14. The media of claim 13, wherein the selected action comprises sending a friend request to the second user of the social-networking system, and the one or more additional user-selectable actions comprise sending a friend request to the one or more suggested users of the social-networking system.

15. The media of claim 14, wherein the one or more suggested users comprise mutual friends of the first user and the second user in the social-networking system.

16. The media of claim 14, wherein one or more of the additional objects associated with one or more of the other users are displayed in the graphical user interface, when rendered, in order of decreasing social coefficient with respect to the first user.

17. The media of claim 13, wherein the selected action comprises confirming a friend request from the second user of the social-networking system, and wherein the one or more additional user-selectable actions comprise sending a friend request to the one or more suggested users of the social-networking system.

18. The media of claim 17, wherein the one or more suggested users comprise mutual friends of the first user and the second user in the social-networking system.

19. The media of claim 13, wherein the one or more social-networking content objects correspond to one or more users of the social-networking system.

20. An apparatus comprising:
one or more processors;
a communications interface;
one or more non-transitory, computer-readable media comprising instructions operable, when executed by one or more processors, to:
send, via the communication interface, to a client computing device associated with a first user of a social-networking system, one or more social-networking content objects for rendering in a graphical user interface of the client computing device, wherein each of the content objects comprises a user-selectable action, and the sending the content objects is performed based at least in part on data associated with the first user in the social-networking system;
receive, from the client computing device, a user-selectable action for one of the content objects, wherein the user-selectable action is associated with a second user of the social-networking system;
perform the user-selectable action;
in response to the received selection, determine one or more suggested users based on the second user, wherein the suggested users are selected from one or more additional users of the social-networking system, a respective social coefficient being computed as between the second user and each of the additional users,
the social coefficients being determined based on one or more demographic factors, the social coefficients for the suggested users being higher than the social coefficients for the other additional users who were not selected, and
the social coefficients of the additional users who are friends of the second user being more heavily weighted than the social coefficients of the additional users who are not friends of the second user; and
send, to the client computing device, one or more additional content objects associated with the suggested users for rendering in the portion of the graphical user interface, wherein the portion of the graphical user interface is expanded to display the additional objects when rendered, and
the additional objects comprise one or more additional user-selectable actions associated with the suggested users.

* * * * *